United States Patent
Fink et al.

(10) Patent No.: US 11,251,886 B2
(45) Date of Patent: Feb. 15, 2022

(54) WAVE SHAPING DEVICE, AN ELECTRONIC DEVICE, AND A SYSTEM

(71) Applicants: CENTRE NATIONAL DE LA RECHERCHE SCIENTIFIQUE—CNRS, Paris (FR); UNIVERSITE PARIS DIDEROT—PARIS 7, Paris (FR)

(72) Inventors: Mathias Fink, Meudon (FR); Geoffroy Lerosey, Paris (FR); Matthieu Dupre, Paris (FR); Nadége Kaina, Villejuif (FR)

(73) Assignees: CENTRE NATIONAL DE LA RECHERCHE SCIENTIFIQUE—CNRS, Paris (FR); UNIVERSITE PARIS DIDEROT—PARIS 7, Paris (FR)

( * ) Notice: Subject to any disclaimer, the term of this patent is extended or adjusted under 35 U.S.C. 154(b) by 0 days.

(21) Appl. No.: 15/022,614

(22) PCT Filed: Apr. 2, 2014

(86) PCT No.: PCT/EP2014/056568
§ 371 (c)(1),
(2) Date: Mar. 17, 2016

(87) PCT Pub. No.: WO2015/039769
PCT Pub. Date: Mar. 26, 2015

(65) Prior Publication Data
US 2016/0233971 A1    Aug. 11, 2016

(30) Foreign Application Priority Data
Sep. 18, 2013 (FR) ..................... 13 58955

(51) Int. Cl.
*H04B 17/309* (2015.01)
*H04W 4/80* (2018.01)
(Continued)

(52) U.S. Cl.
CPC ............ *H04B 17/309* (2015.01); *H01Q 3/44* (2013.01); *H01Q 3/46* (2013.01);
(Continued)

(58) Field of Classification Search
CPC .......... E02D 29/14; H01Q 1/288; H01Q 1/38; H01Q 3/00; H01Q 3/24; H01Q 3/42;
(Continued)

(56) References Cited

U.S. PATENT DOCUMENTS 5,697,063 A * 12/1997 Kishigami ............ H01Q 1/007
455/25
6,175,723 B1 * 1/2001 Rothwell, III ........... H01Q 3/24
342/359

(Continued)

FOREIGN PATENT DOCUMENTS

JP   2007-143044 A   6/2007
WO   2004032191 A2   4/2004

OTHER PUBLICATIONS

L. Subrt and P. Pechac, "Intelligent walls as autonomos parts of smart indoor environments", Jun. 30, 2010; www.ietdl.org; ISSN 1751-8628; pp. 1004-1010.*

(Continued)

*Primary Examiner* — Nizar N Sivji
(74) *Attorney, Agent, or Firm* — von Briesen & Roper, s.c.

(57) ABSTRACT

A wave shaping device which comprises a tunable impedance surface and a controller connected to the surface in order to control its impedance. The shaping device further (Continued)

comprises a transmission module for receiving a pilot signal used to control the impedance of the surface.

17 Claims, 6 Drawing Sheets

(51) Int. Cl.
*H01Q 3/46* (2006.01)
*H01Q 21/00* (2006.01)
*H01Q 3/44* (2006.01)
*H04L 5/00* (2006.01)

(52) U.S. Cl.
CPC ....... *H01Q 21/0018* (2013.01); *H04L 5/0048* (2013.01); *H04W 4/80* (2018.02)

(58) Field of Classification Search
CPC .......... H01Q 3/44; H01Q 3/46; H01Q 9/0442; H01Q 9/04; H01Q 15/0066; H01Q 15/002; H01Q 15/008; H01Q 15/02; H01Q 15/24; H01Q 19/104; H01Q 21/0006; H01Q 21/0018; H01Q 21/06; H01Q 21/061; H01Q 21/065; H01Q 21/22; H01Q 1/40; H01Q 3/01; H01Q 3/34; H01Q 3/443; H01Q 13/28; H01Q 15/006; H01Q 15/22; H01Q 19/005; H01Q 9/0414; H01Q 1/286; H01Q 1/28; H01Q 1/521; H01Q 1/526; H01Q 15/141; H01Q 15/142; H01Q 15/148; H01Q 15/14; H01Q 1/52; H01Q 9/18; H01Q 9/26; H01Q 3/2605; H02J 7/025; H02J 17/00; H02J 7/00; H02J 5/005; H02J 50/15; H03D 7/166; H04B 17/309; H04B 5/0031; H04B 5/0037; H04B 17/0087; H04L 5/0048; H04W 4/008; H04W 4/80; G01S 7/032; G01S 13/89; H01L 27/14669
See application file for complete search history.

(56) References Cited

U.S. PATENT DOCUMENTS

| | | | |
|---|---|---|---|
| 6,492,942 B1* | 12/2002 | Kezys | H01Q 3/26 342/368 |
| 6,538,621 B1 | 3/2003 | Sievenpiper et al. | |
| 7,190,325 B2 | 3/2007 | Nagy et al. | |
| 7,245,269 B2 | 7/2007 | Sievenpiper et al. | |
| 7,714,654 B2* | 5/2010 | Ryynanen | H03F 3/45085 330/254 |
| 2003/0048223 A1* | 3/2003 | Kezys | H01Q 3/26 342/368 |
| 2004/0227667 A1* | 11/2004 | Sievenpiper | H01Q 3/26 343/700 MS |
| 2004/0227668 A1* | 11/2004 | Sievenpiper | H01Q 13/20 343/700 MS |
| 2004/0263408 A1* | 12/2004 | Sievenpiper | H01Q 3/46 343/757 |
| 2005/0054318 A1* | 3/2005 | Fujii | H01Q 3/44 455/272 |
| 2005/0179614 A1* | 8/2005 | Nagy | H01Q 3/24 343/909 |
| 2008/0198425 A1* | 8/2008 | Ozaki | H04N 1/00885 358/475 |
| 2009/0009391 A1 | 1/2009 | Fox | |
| 2009/0135945 A1* | 5/2009 | Lee | H04B 7/015 375/285 |
| 2010/0119234 A1* | 5/2010 | Suematsu | H04B 10/90 398/135 |
| 2011/0244786 A1* | 10/2011 | Fujii | H01Q 19/10 455/7 |
| 2012/0206299 A1* | 8/2012 | Valdes-Garcia | H01Q 19/102 342/359 |
| 2012/0300593 A1* | 11/2012 | Perry | H04B 11/00 367/181 |
| 2014/0368161 A1* | 12/2014 | Leabman | H02J 7/025 320/108 |
| 2021/0167873 A1* | 6/2021 | Lerosey | H04B 17/102 |

OTHER PUBLICATIONS

International Search Report Application No. PCT/EP2014/056568 dated Jun. 6, 2014.

Apostolos Georgiadis "Patent on Reconfigurable Reflectarray Antennas" Department of Communications Subsystems, Centre Tecnologic de Telecommunicacions de Catalunya (CTTC), Spain, 2009.

Ludek Subrt "Controlling Propagation Environments Using Intelligent Walls" Faculty of Electrical Engineering, Czech Technical University in Prague Technicka 2, 166 27, Prague 6, Czech Republic, 2012.

L. Subrt "Intelligent walls as autonomous parts of smart indoor environments" Department of Electromagnetic Field, Czech Technical University in Prague, Technicka 2, Prague 166 27, Czech Republic—E-mail: ludek.subrt@fel.cvut.cz, Published in IET Communications Received on Jun. 30, 2010, Revised on Apr. 8, 2011, DOI: 10.1049/iet-com.2010.0544.

Indian Office Action related to Application No. 201647008899 dated Sep. 26, 2019.

Japanese Office Action related to Application No. 2016-543333, dated Oct. 15, 2019.

* cited by examiner

WAVE SHAPING DEVICE, AN ELECTRONIC DEVICE, AND A SYSTEM

CROSS-REFERENCE TO RELATED APPLICATION

This Application is a 35 USC § 371 US National Stage filing of International Application No. PCT/EP2014/056568 filed on Apr. 2, 2014, and claims priority under the Paris Convention to French Patent Application No. 13 58955 filed on Sep. 18, 2013.

FIELD OF THE DISCLOSURE

Technical Field

The present invention relates to a wave shaping device, an electronic device communicating with the shaping device by a pilot signal, and a system comprising such a shaping device and such an electronic device.

BACKGROUND OF THE DISCLOSURE

More particularly, the invention relates to a shaping device, comprising:
- a surface which interacts (reflects or transmits) with a wave, said surface comprising a plurality of tunable elements for changing an impedance of said surface and the manner in which the wave is reflected and/or transmitted by said surface, and
- a controller connected to the surface in order to control each of the tunable elements.

U.S. Pat. No. 6,538,621 discloses a tunable impedance surface for steering or focusing a radio frequency beam. It comprises for example a ground plane, a plurality of array elements at a short distance from the ground plane, and an arrangement of adjustable capacitors between adjacent array elements.

U.S. Pat. No. 7,245,269 describes the use of this tunable impedance surface in conjunction with a feed horn to form a wireless communication network antenna that is directional, meaning that the sending and/or receiving direction of the wireless communication network antenna can be steered.

These are satisfactory devices.

SUMMARY OF THE DISCLOSURE

The present invention aims to propose other applications of the above tunable impedance surface.

The invention relates to a shaping device of the above type that is characterized in that it further comprises a transmission module which is connected to the controller and which receives a pilot signal, and in that the controller controls the tunable elements according to the pilot signal received by the transmission module.

By these arrangements, the controller can order modifications to the impedance of the surface based on information contained inside a pilot signal that is received by the transmission module.

The shaping device is independent from the source that sent the wave (primary wave). It may, for example, be remotely controlled (at short-range distance) by another electronic device, such as a movable device (phone, internet box), which allows modifying the wave reflection and/or transmission based on local information from the electronic device (i.e. information from a locus near the shaping device).

The tunable impedance surface is not connected to a transmitting antenna of a network. It may be placed or positioned in a location remote from the wave source (the network antenna), meaning with the user (for example at his house).

There are many applications for a wave shaping device of this type. It is thus possible:

1) to improve the reception of a wave by the shaping device itself if the pilot signal is the received wave, or by an electronic device near the shaping device; or 2) to cancel out any reception of the wave and thus protect a spatial area around the determined locus (the locus of the shaping device or the locus of the electronic device); or 3) to jam or cancel out the transmission of a wave transmitted by an interfering transmitter located for example close to the shaping device.

The waves received and reflected or transmitted by the surface may be radio waves (for example from a mobile telephony), or acoustic waves. In the first case the surface is an electromagnetic surface, such as in U.S. Pat. No. 6,538,621. In the second case the surface is an acoustic surface having a controllable impedance.

In the first application, the impedance of the surface is modified to improve and accurately tune the reception of an electronic device (e.g. a mobile phone) in an environment where reception is difficult. This is often due to environmental complexities which create multiple electromagnetic reflections and produce significant localized amplifications or attenuations and/or significant phase shifts of a radio wave.

The cellular network antenna, positioned at a large distance away from the electronic device, cannot easily be adapted to such specific environment, even when using a directional antenna. Moreover, such a directional network antenna increases the transmission power in an area surrounding the electronic device, without solving the complexity issue mentioned above.

In such an application, the invention allows improving the reception of radio waves in the vicinity of a an electronic communication device (a movable device, such a mobile phone or an internet box).

In the second application, the impedance of the surface is modified to cancel out the reception of an electronic device. The reception of radio waves within an area surrounding the electronic device is then very weak.

In such an application, the invention conversely suppresses any reception and thus protects the area (for example, if the waves are considered detrimental). If the waves are acoustic waves, this principle has the effect of forming an area of silence in a noisy outdoor or indoor environment.

In the third application, the invention allows canceling out or jamming transmissions from an interfering transmitter, for example transmissions from en electronic device (a mobile phone) in the room where the shaping device is located.

In various embodiments of the shaping device of the invention, one or more of the following arrangements may be used.

In one aspect of the invention, each tunable element comprises only two states, the states of all the tunable elements defining the impedance of the surface.

In one aspect of the invention, the two states correspond to module or phase shifts.

In one aspect of the invention, the tunable elements interact with a wave propagating in a first propagation channel, and the transmission module receives the pilot signal propagating in a second propagation channel, the second propagation channel being different from the first propagation channel.

In one aspect of the invention, the tunable elements are electromagnetic elements having an electromagnetic tunable characteristic.

In one aspect of the invention, the tunable elements are acoustic elements having an acoustic tunable characteristic.

In one aspect of the invention, the transmission module is adapted to receive only short-range wireless transmissions, for example having an unobstructed transmission distance range of less than 100 meters.

In one aspect of the invention, the transmission module is adapted to receive a pilot signal from a wireless connection to a local area network, such as a WiFi, a Bluetooth or a NFC connection.

In one aspect of the invention, the transmission module is adapted to receive a pilot signal from an acoustic connection that is inaudible, for example within an ultrasonic frequency band.

In one aspect of the invention, the transmission module is integrated into the surface.

In one aspect of the invention, the surface is integrated into an element chosen from among a list comprising:
constructional elements of a building, such as a concrete block, a brick, insulation, an insulating board, a plasterboard, and
decorative elements of the building, such as wood flooring, carpeting, tile flooring, a trim panel, a partition, a ceiling, a dropped-ceiling panel, and
furnishings, such as a desk, cabinet, bookcase, mirror, decorative table, lamp.

In one aspect of the invention, the shaping device further comprises a power component connected to the surface, said power component being adapted for recovering an amount of energy from the wave received by the surface.

In one aspect of the invention, the shaping device further comprises a power component connected to a photoelectric cell, said power component being adapted for recovering an amount of energy from light.

In one aspect of the invention:
the transmission module is wirelessly connected to an electronic device by the pilot signal, said pilot signal containing data from said electronic device, and
the controller comprises an optimization module that minimizes or maximizes a value in order to determine parameters, said value being determined based on said data which are a function of the wave received by the electronic device, and
the controller controls the tunable elements based on said parameters.

In one aspect of the invention, the value is chosen from among an amplitude, a power level, and a quality index for the wave received by the electronic device.

In one aspect of the invention:
the transmission module is wirelessly connected with an electronic device by the pilot signal, said pilot signal containing data from said electronic device, said data being a function of the wave received by the electronic device, and
the controller determines parameters based on said data and controls the tunable elements based on said parameters.

In one aspect of the invention, the data are the parameters for directly controlling the tunable elements, and the electronic device comprises an optimization module that minimizes or maximizes a value in order to determine parameters, said value being determined based on said data which are a function of the wave received by the electronic device.

In one aspect of the invention, the value is chosen from among an amplitude, a power level, and a quality index for the wave received by the electronic device.

In one aspect of the invention, the pilot signal is the wave received by the surface, the transmission module is adapted to receive said wave, and the controller comprises:
a monitoring module which determines a value that is a function of the wave received by the transmission module,
an optimization module which maximizes or minimizes the value in order to determine parameters, and wherein the controller controls the tunable elements based on said parameters.

In one aspect of the invention, the value is chosen from among an amplitude, a power level, and a quality index for the wave received by the electronic device.

The invention also relates to an electronic device comprising:
a processing unit,
a receiving unit connected to the processing unit and adapted for receiving a wave, and
a transmission unit connected to the processing unit and communicating with a shaping device by transmitting a pilot signal.

The electronic device comprises a monitoring module that determines at least one value that is a function of the wave received by the receiving unit, and transmits data that are a function of said value to the shaping device.

Various embodiments of the electronic device according to the invention may optionally make use of one or more of the following arrangements.

In one aspect of the invention, the value is chosen from among an amplitude, a power level, and a quality index for the wave received by the receiving unit.

In one aspect of the invention, the data comprise said value.

In one aspect of the invention, the processing unit further comprises an optimization module that maximizes or minimizes the value in order to determine parameters, said parameters being transmitted in the data.

In one aspect of the invention:
the processing unit is incorporated inside a first casing, and
the transmission unit is incorporated inside a second casing, the first and second casing being removably attached one to the other for connecting the processing unit to the transmission unit.

The invention also relates to a system comprising:
a shaping device for interacting with a wave as described above, and
an electronic device as described above, the transmission unit of the electronic device being compatible with the transmission module of the shaping device such that the electronic device transmits a pilot signal to the shaping device via said transmission unit and transmission module, said pilot signal comprising data.

The electronic device comprises a monitoring module which determines at least one value that is a function of the wave received by the receiving unit, and transmits to the shaping device the data that are a function of said value.

Various embodiments of the system according to the invention may optionally make use of one or more of the following arrangements.

In one aspect of the invention, the value is chosen from among an amplitude, a power level, and a quality index for the wave received by the receiving unit.

In one aspect of the invention, the data comprise said value.

In one aspect of the invention, the processing unit comprises an optimization module that maximizes or minimizes the value in order to determine parameters, said parameters being transmitted in the data.

BRIEF DESCRIPTION OF DRAWINGS

Other features and advantages of the invention will become apparent from the following description of one of its embodiments, given by way of non-limiting example, with reference to the accompanying drawings.

In the drawings:

FIGS. 8 to 11 are plot corresponding to experiments for enhancing the received signal at the receiver antenna;

FIGS. 12 to 15 are plots corresponding to experiments for cancelling the received signal at the receiver antenna;

In the various figures, the same numeric references are used to indicate identical or similar elements.

DETAILED DESCRIPTION OF THE DISCLOSURE

The invention relates to a wave shaping device. The wave is a main or primary wave, which may be electromagnetic, acoustic, or vibrational in nature.

For simplicity, we will describe the invention primarily in the context of its application to an electromagnetic wave, particularly for use in mobile telephony. However, the invention applies to any wave frequency domain.

Figure 1:
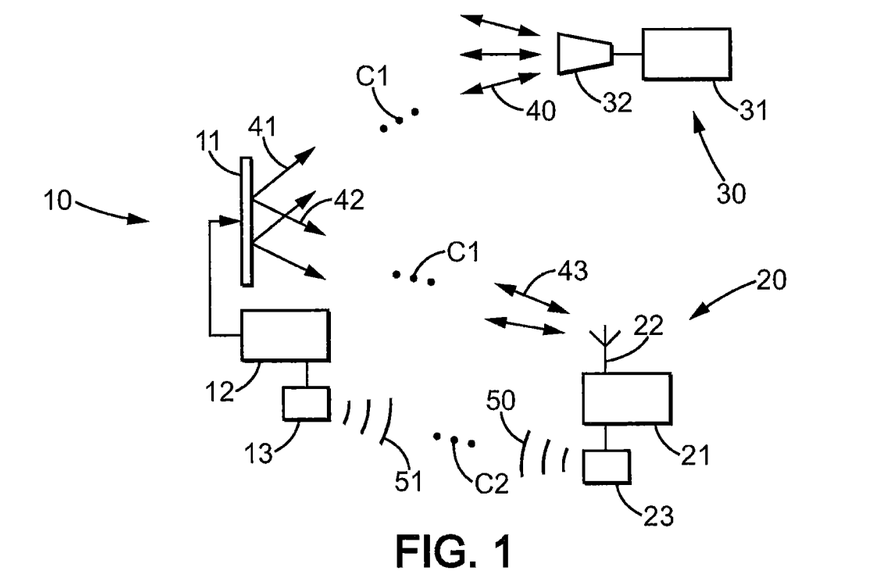
FIG. 1 is a general schematic view of a mobile telephone communication network comprising a shaping device of the invention.

FIG. 1 is a schematic view showing a cellular communication network, which is known to comprise:

- a network station 30 responsible for transmitting and receiving radio communications into a first communication channel C1 (primary wave propagation channel), for example corresponding to a mobile phone station, or an internet box diffusing internet inside a building via WiFi, and
- an electronic device 20, for example corresponding to a mobile phone, a laptop computer equipped with a mobile telephony module or WiFi module, or any device equipped with such a mobile telephony or WiFi module.

The electronic device 20 is mobile or movable from one place to an other. It is powered via an electric plug or powered via an internal battery. The electronic device 20 may not be mobile, and the location of the electronic device 20 may be determined by various reasons that do take care of the quality of radio reception from the network station 30.

According to the invention, this communication network further comprises a shaping device 10 placed at a short distance or at short range from the movable electronic device 20. The aim of this shaping device 10 is, for example, to improve the reception of the electronic device 20 in an area encompassing the electronic device and in the vicinity of the shaping device 10. This shaping device 10 is, for example, useful in an environment causing many and/or complex reflections of electromagnetic waves, where these reflections interfere with the reception of the electronic device 20. The shaping device 10 generates another reflection and/or a transmission which is controlled for example in order to improve the reception of the electronic device 20.

The network station 30 for mobile telephony comprises:
- a communication unit 31 that receives a communication to be transmitted to an electronic device 20 (mobile phone),
- a network antenna 32 which transmits the communication by a transmission radio wave 40 which propagates into the first communication channel C1.

The first communication channel C1 is a communication channel suitable for mobile telephony, for example such as GSM or UMTS, or suitable for a computer network, for example such as WiFi, Bluetooth, or NFC.

The electronic device 20 comprises at least:
- an antenna 22 (or receiving device) for receiving and transmitting a radio wave 43 in the first communication channel C1, and
- a processing unit 21 connected to said antenna 22, for processing signals from and to the antenna 22.

The electronic device 20 normally receives a radio wave (not shown) from the network antenna 32, either directly or indirectly by reflection on environmental elements. In the context of the present invention, it also receives a modified radio wave 43 originating from a (reflected or transmitted) modified wave 42 originating from the shaping device 10.

Advantageously, the electronic device 20 also comprises a transmission unit 23 for wireless communication via a second communication channel C2.

The shaping device 10 comprises
- an (electromagnetic) surface 11 which reflects and/or transmits an incident radio wave 41 as a (reflected or transmitted) modified wave 42, said waves propagating into the first communication channel C1, and
- a controller 12 connected to the electromagnetic surface 11 in order to control said electromagnetic surface 11, in particular in order to vary an electromagnetic impedance, thereby changing how the incident wave 41 is reflected and/or transmitted as a modified wave 42.

This shaping device 10 is advantageously located at a location with difficult reception for electronic devices 20. It is therefore at a short distance from the electronic device 20. It reflects and/or transmits an incident wave 41 emitted by the network station 30 or reflected by another element of the environment or by another shaping device. In a very simplified manner, the modified wave 42 then propagates into the first communication channel C1 as well, for example toward the electronic device 20 (mobile device).

The U.S. Pat. No. 6,538,621 shows one type of electromagnetic surface whose impedance is adaptable or modifiable that can be used in the shaping device according to the invention. This electromagnetic surface comprises a plurality of resonant elements, each resonant element being tunable. The electromagnetic surface of that patent comprises array elements located at a distance from a ground plane, adjacent array elements being connected together by a variable capacitor arrangement, each variable capacitor controllable by a control potential. The impedance of the electromagnetic surface is modified accordingly, for example in order to focus the modified wave or to give a direction to the modified wave.

Optionally, the electromagnetic surface 11 of the invention consists of a plurality of cells (tunable elements represented on FIG. 6), each cell comprising two separate resonator elements. The first resonator resonates at a first frequency $f_1$ and the second resonator resonates at a second frequency $f_2$ which is different from the first frequency, said second frequency $f_2$ also being tunable by a variable capacitor or by a variable diode. Such a cell allows reflecting an incident wave 41 with a positive sign or a negative sign, depending on whether the second frequency $f_2$ is close to or far from the first frequency $f_1$. The set of cells of the electromagnetic surface 11 allow obtaining highly effective modifications to the impedance of said surface.

Optionally, the set of cells (tunable elements 14) of the electromagnetic surface 11 of the invention has a single polarization type or two polarization types. In the second case, the electromagnetic surface 11 comprises resonator elements of the first and second polarization types. The resonator elements of each type are advantageously distributed over the entire surface, for example in alternation. The electromagnetic surface 11 then provides control of an incident wave 41, regardless of its polarization type.

Optionally, the set of resonator or tunable elements of the electromagnetic surface 11 has a single resonance frequency or two or a plurality of resonance frequencies. The electromagnetic surface 11 then allows controlling a frequency range or band, or a plurality of frequency bands depending on the proximity of the frequencies in the plurality. The electromagnetic surface 11 then allows controlling an incident wave 41 over a predetermined frequency band, which may be a wide frequency band if the set of resonator elements covers this frequency band.

The set of tunable elements may comprise only two different states. The tunable element 14 is therefore a binary element. All the tunable elements states define specific impedance for the electromagnetic surface 11. The two states may be a phase shift of modified wave regards to the incident wave, or may be an amplitude shift of modified wave regards to the incident wave. Thanks to these only two states of each resonator tunable elements 14, the number of combinations is reduced, but enough for optimization process.

In case of phase shifts, each tunable element 14 may reflect or transmit the incident wave into a modified wave having a phase shift relative to the incident wave, said phase shift being preferably of zero radian for the first state (meaning that the modified wave do not have is phase modified) and π radians for the second state (meaning that the modified wave has his phase shifted of π radian, i.e. is the opposite wave).

Alternatively, the phase shift is of alpha radians for the first state (alpha being an angle value between zero and π) and alpha+π radians for the second state.

In case of amplitude shift, each tunable element 14 may reflect or transmit the incident wave into a modified wave having an amplitude shift relative to the incident wave (amplification coefficient), said amplitude shift being preferably of zero for the first state (meaning that the modified wave is null) and one for the second state (meaning that the modified wave is identical to the incident wave).

Additionally, more than two states can also be used for having more flexibility.

The controller 12 of the shaping device 10 according to the invention controls, for example, all the tunable elements (variable capacitors or diodes) of the electromagnetic surface 11, thereby modifying the impedance of the tunable element itself, and modifying the impedance of the surface 11. This modification is much more complex than focusing or spatial directivity. It alters the spatial distribution of the radio wave into the first communication channel C1 inside an area around the shaping device 10.

According to the invention, the shaping device 10 comprises a transmission module 13 connected to the controller 12. This transmission module 13 is essentially a means for receiving a wave (a receiving device) and converting it into a pilot signal. This pilot signal is either representing the wave (main or primary wave) propagating into the first communication channel C1, or an other wave propagating into a second communication channel C2 (that is different from the first communication channel). In some cases, the transmission module 13 may optionally send information to an electronic device 20.

In the first case, the transmission module 13 is a radio transmission antenna adapted for the first communication channel C1, for example a telephony channel.

In the second case, the transmission module 13 is a transmission antenna for a second communication channel C2 which is advantageously a channel for short-range communications, e.g. a distance lower than 100 meters in an unobstructed field. It experiences less or little interference from environmental elements.

In a first variant, the transmission module 13 is for example an electromagnetic antenna for wireless data transmission, for example WiFi or Bluetooth, and the second communication channel C2 is an electromagnetic channel.

In a second variant, the transmission module 13 is for example an acoustic transducer, such as a speaker and/or microphone or a combination thereof, and the second communication channel C2 is acoustic. In this case, the second communication channel C2 is advantageously in an inaudible frequency band, for example ultrasonic. Thus, the mobile electronic device 20 can transmit data to the shaping device 10 without this transmission of data being perceptible to a user.

Other variations of the transmission module 13 are possible. For example, the transmission module 13 is an optical transducer (ultraviolet or laser).

The data transmitted in the second communication channel C2 between the electronic device 20 and the shaping device 10 can be of various types, depending on the distribution of the software modules or functions between the electronic device 20 and the shaping device 10.

The controller 12 modifies the tunable elements of the electromagnetic surface 11 according to the pilot signal received by the transmission module 13, thereby modifying the impedance of the surface 11.

By means of the pilot signal, the controller 12 orders modifications to the impedance of the electromagnetic surface 11 based on information on the wave received either directly by the shaping device 10 (autonomous operation) or via an electronic device 20 (controlled operation). As the electronic device 20 is at short-range from the shaping device 10, the controller 12 modifies the impedance of the surface 11 based on information on the wave received at a location near the shaping device 10. The modification of the wave received by an electronic device 20 in proximity to or at short-range from the shaping device 10 can therefore be better tuned or adapted than any modification to the wave emitted by the network station 30. In this manner, the shaping device 10 does not have a wired connection to the network station 30, and is not controlled by the network station 30. In other words, the shaping device 10 therefore has no information on the wave source (electromagnetic, acoustic or vibrational).

Figure 2:
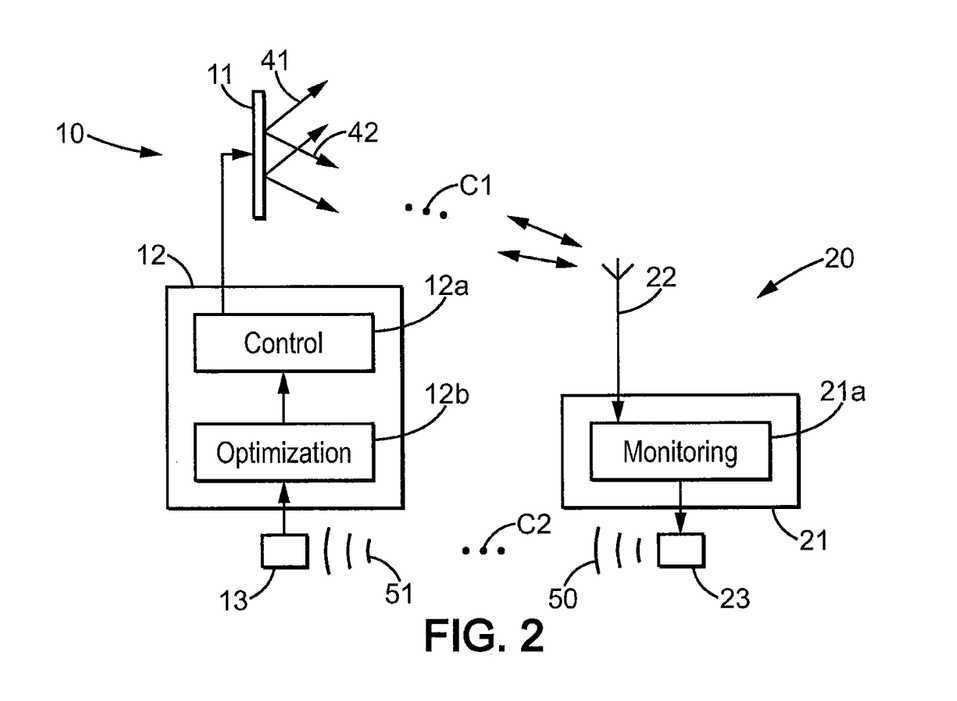
FIG. 2 is a view of a first embodiment of the invention of FIG. 1.

According to a first embodiment of the invention, represented in FIG. 2, the electronic device 20 comprises a monitoring unit 21a that determines at least one value corresponding either to:
  a strength of the signal received by the antenna 22 (power level or amplitude of the radio signal received over a predetermined period of time), or to
  a quality index for the radio wave received (for example communication error rate into the first communication channel).

The electronic device 20 then transmits this value to the shaping device 10 by a transmission unit 23 of the same type as the transmission module 13 of the shaping device 10 (compatible). This value may be included into a set of data transmitted by the transmission unit 23 of the electronic device 20 to the transmission module 13 of the shaping device 10. The transmission unit 23 of the electronic device 20 thus emits a wave 50, which propagates into a second communication channel C2 towards the shaping device 10, in a wave 51 representing or also called the "pilot signal". In this case, the second communication channel C2 is different from the first communication channel C1. This second channel C2 has less interference than the first one, and the shaping device 10 is easily connected to the electronic device 20 in order to modify the impedance of the electromagnetic surface 11.

The shaping device 10 receives the value by its transmission module 13, which provides it to the controller 12.

The controller 12 of the shaping device 10 comprises:
  an optimization module 12b which receives said value from the transmission module 13 and determines control parameters for the electromagnetic surface 11, and
  a control module 12a connected to the electromagnetic surface 11, said control module 12a applying the control parameters to the electromagnetic surface 11 in order to modify its impedance.

The optimization module 12b executes an optimization algorithm based on the set of (temporally) previous parameters, previous values, and the current value provided by the electronic device 20.

The optimization algorithm may be a maximization or minimization of the value. For example, if the desired goal is to increase the intensity of the signal received by the electronic device 20, the optimization algorithm will look for a maximum. Conversely, if the desired goal is to reduce the intensity of the signal received by the electronic device 20, the optimization algorithm will look for a minimum. In several successive steps, the optimization algorithm provides an optimum set of parameters.

The control unit 12a of the controller 12 then applies the set of parameters determined by the optimization module 12b and controls the tunable resonator elements of the electromagnetic surface 11. This determines a particular state of the electromagnetic surface 11, which modifies the radio wave 42 reflected or transmitted by said electromagnetic surface 11.

The radio wave 43 received by the electronic device 20 is a combination of this reflected and/or transmitted modified radio wave 42 and a radio wave from the network antenna 32. The state of the electromagnetic surface 11 thus modifies the reception of the radio wave 43 received by the electronic device 20.

In several successive steps, during which the control parameters for the electromagnetic surface 11 are applied by the controller 12 and values are obtained by the monitoring unit 21a of the electronic device 20, the algorithm of the optimization module 12b implemented in the controller 12 finds a set of optimum control parameters corresponding to the desired goal (optimization criterion).

There are numerous known optimization algorithms that may be used: LMS (least mean squares), genetic, simplex, etc.

Optionally, once the optimization is done, the shaping device 10 can transmit information to the electronic device, via the transmission module 13, concerning the optimization performed, its status, and its performance.

The electronic device 20 is independent from the shaping device 10: it can communicate by the first communication channel C1 even before the process of optimizing the impedance of the electromagnetic surface 11 is carried out or completed.

Figure 3:
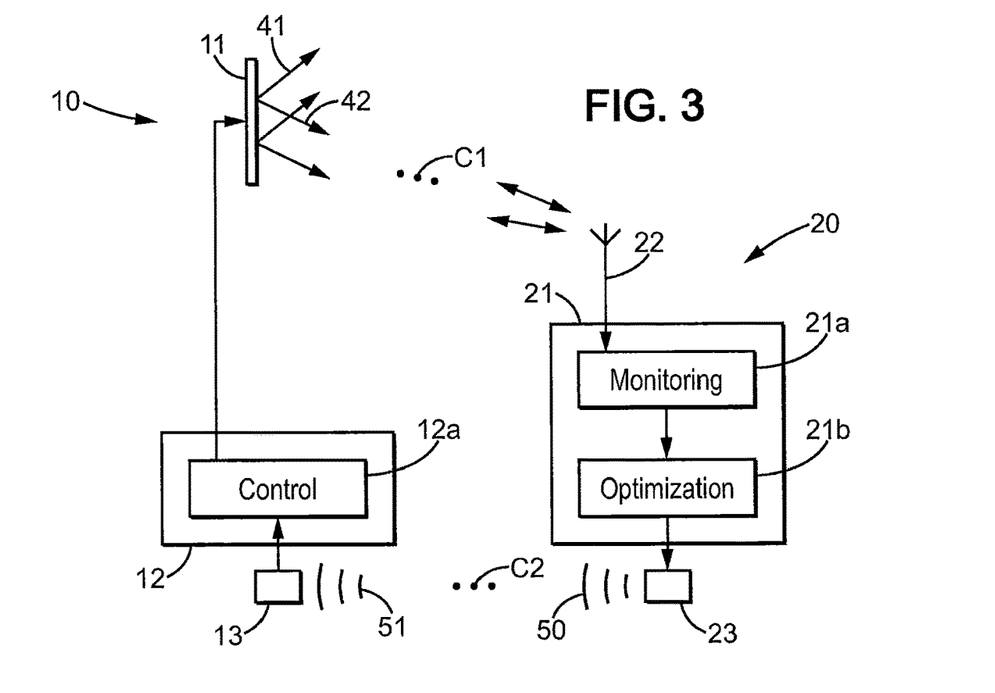
FIG. 3 is a view of a second embodiment of the invention of FIG. 1.

According to a second embodiment of the invention, represented in FIG. 3, the electronic device 20 comprises:
  a monitoring unit 21a connected to the transmission unit 23, and being similar or identical to the one in the first embodiment, and
  an optimization unit 21b that is equivalent to the optimization module 12b of first embodiment.

This optimization unit 21b is now implemented inside the electronic device 20, and the latter transmits the set of parameters to the shaping device 10 via the transmission unit 23. The set of parameters can be included into a set of data transmitted by the transmission unit 23 of the electronic device 20 to the transmission module 13 of the shaping device 10. The transmission unit 23 of the electronic device 20 thus emits a wave 50, which propagates into a second communication channel C2 to the shaping device 10 in a pilot signal 51. The second communication channel C2 is different from the first communication channel C1, with less interference, and the electronic device 20 easily connects to the shaping device 10 in order to modify the impedance of the electromagnetic surface 11.

The shaping device 10 receives the set of parameters via its transmission module 13, and the controller 12 which comprises only the control module 12a applies this set of control parameters to the electromagnetic surface 11 in order to change its impedance.

The shaping device 10 of the second embodiment is then working as the one the first embodiment.

Figure 4:
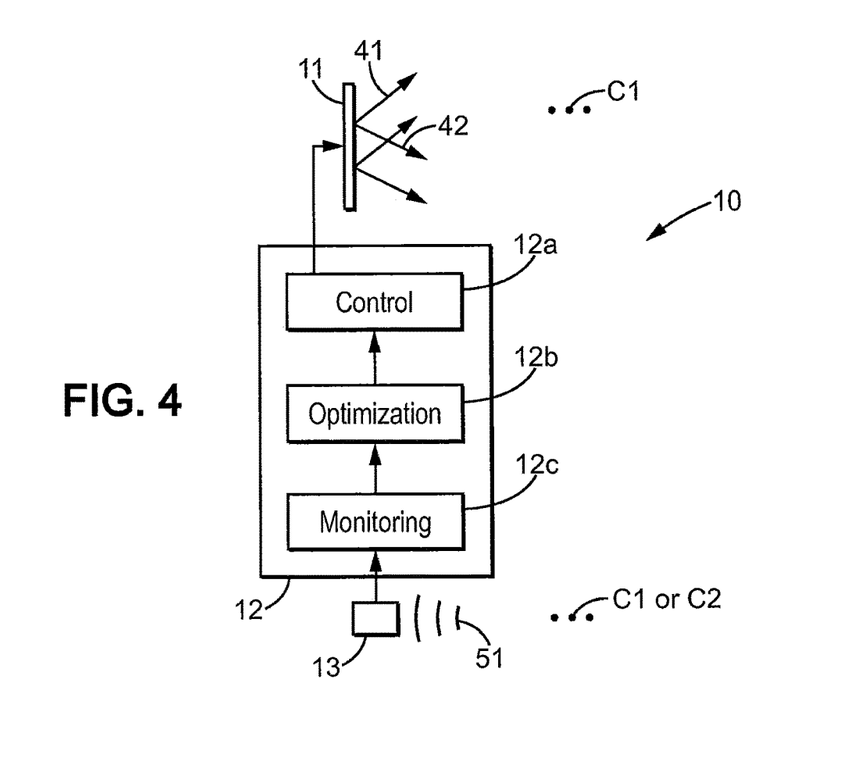
FIG. 4 is a view of a third embodiment of the invention of FIG. 1.

In the third embodiment, illustrated in FIG. 4, the shaping device 10 is autonomous and comprises a transmission module 13 that is for example a microphone.

The shaping device 10 comprises:
- a monitoring module 12c connected to the transmission module 13, said monitoring module 12c being equivalent (similar or identical) to the monitoring unit 21a implemented inside the electronic device in the first and second embodiments,
- an optimization module 12b which receives the value from the monitoring module 12c and determines control parameters, and
- a control module 12a connected to the electromagnetic surface 11, said control module 12a applying the control parameters to the electromagnetic surface 11 in order to modify its impedance.

The optimization module 12b integrated into the controller 12 of the shaping device 10 minimizes or maximizes a value, such as the level of reception of the acoustic wave 51 received by the microphone 13 and originating from an unknown sound source. The shaping device 10 of this third embodiment is then autonomous.

The shaping device 10 of the third embodiment is then working as one of the previous embodiments.

The shaping device 10 is a controllable passive device that consumes very little energy. It is not able to emit itself an acoustic wave, without an incident acoustic wave 41.

In all embodiments of the invention, the shaping device 10 is a device independent from the network station 30 and its antenna. The shaping device 10 is autonomous, and responds to an electronic device 20 in order to optimize (maximize or minimize) the reception of said electronic device 20.

The shaping device 10 may take the form of a panel, for example mounted on a wall of a space, room, house, or area to be controlled.

An electronic device 20 which lies within the scope of this shaping device 10, and which comprises for example a software module for connecting via its transmission unit 23 to said shaping device 10, may automatically request modifications to the impedance of the electromagnetic surface 11 of the shaping device 10.

The electronic device 20 may optionally connect to multiple shaping devices 10 to provide better control of a specific spatial area.

The shaping device 10 may optionally connect to multiple electronic devices 20 in order to modify the impedance of the electromagnetic surface 11 according to the multiple objectives of each electronic device. For example, it is possible to modify the impedance of the electromagnetic surface 11 to enhance or increase the reception on two electronic devices 20. It is also possible to modify the impedance of the electromagnetic surface 11 in order to increase reception into a first spatial area around a first electronic device, and simultaneously cancel out or reduce the reception into a second spatial area around a second electronic device.

In the first embodiment, each shaping device 10 will optimize its set of parameters. All the shaping devices 10 are advantageously identical, and the electronic device 20 is doing very little processing and computing.

In the second embodiment, the electronic device 20 can determine the sets of parameters for each shaping device 10 while taking into account combinations, which can provide better electromagnetic processing and better control for the area. All the shaping devices 10 are simplified and preferably identical. However, the electronic device 20 will perform more calculations and more processing to determine the sets of parameters for all the shaping devices 10.

It should be noted that the electromagnetic surface 11 is a passive device that consumes very little power. This device does not emit additional electromagnetic radiation. It modifies the local electromagnetic field by moving the nodes (minima) and antinodes (maxima) of the electromagnetic field. This device is therefore not an amplifier or repeater of a wave. Its energy consumption is mainly due to the controller 12 and its short-range transmission module 13.

The shaping device 10 may therefore be an autonomous device, where appropriate powered by a rechargeable battery.

The shaping device 10 may also comprise a power supply component that may be connected to the electromagnetic surface 11 for recovering an amount of energy from the incident wave. The amount of energy recovered is enough for powering the shaping device 10.

The shaping device 10 may also comprise a power supply component that may be connected to a photoelectric cell for recovering an amount of energy for example from the sun light or ambient light.

Additionally, the shaping device 10 may comprise means for providing energy to the electronic device 20. For example, the shaping device 10 incorporates a connector for connecting the electronic device 20 and for refilling its battery.

It should also be noted that the location of the shaping device 10 within the processing area is important to its effectiveness. A prior step of determining this location is therefore preferred. The shaping device 10 and/or the electronic device 20 may include a software module for determining said location.

In addition, the transmission module 13 may consist of a single transducer or a plurality of transducers distributed spatially. In the case of the third application (jamming an interfering transmitter), these transducers will be distributed so as to cancel out far-field emissions of such an interfering transmitter. Furthermore, the transducer or transducers of the transmission module 13 may be integrated and/or distributed on the electromagnetic surface 11 in order to form a single integrated device.

Finally, in the case of a shaping device 10 which comprises a broadband electromagnetic surface 11 (for example with resonator elements at multiple resonance frequencies), the optimization modules 12b, 21b can perform optimization:
either for each frequency independently of an other frequency (in this case, each frequency of the reflected wave may have any phase);
or for all frequencies considered synchronously. In this case, each frequency of the (reflected and/or transmitted) modified wave can have a predetermined phase relative to an other frequency. It is then possible to readjust the phase of all frequencies relative to each other in order to carry out broadband focusing.

Additionally, in the various embodiments, the electronic device 20 may be composed of two parts: a first one having a first casing incorporating at least the processing unit 21 and a second one having a second casing incorporating at least the transmission unit 23.

The first and second casing being removably attached one to the other for connecting the processing unit 21 to the transmission unit 23. The casings may comprise complementary shapes for attachment, and for example elastic clips.

The processing unit 21 is connected to the transmission unit 23 via a wired or wireless connection. They are for example connected together via a USB port.

Thanks to these features, the first part may be a conventional mobile phone, and the second part may add to the mobile phone hardware and software capabilities so that to be able to control a shaping device 10.

The shaping device 10 according to the invention has many possible uses: improving mobile phone reception in an area where there are interferences, canceling out mobile phone reception in a specific area where they are prohibited or in order to protect from radio waves, canceling out reception of wireless transmissions such as WiFi within a specific area.

For example, it is possible to place the electronic device 20 above a baby's crib and the shaping device 10 inside the baby's room. The electronic device 20 controls the shaping device 10 in order to cancel out any radio waves (of cellular phones or WiFi) at the crib, without canceling out said waves throughout the entire house.

Finally, the optimization module is a software module that can be implemented, added, and updated easily within the electronic device 20 or the shaping device 10. In particular, this optimization module can be downloaded easily via the network of the first communication channel C1 or via the network of the second communications channel C2.

The various embodiments of the invention may also be applied to the field of acoustics, in which the primary wave (source) is an acoustic wave.

The shaping device 10 then comprises a plurality of acoustic resonator elements having a tunable portion for modifying its impedance. These resonator elements are, for example, Helmholtz resonators comprising a cavity and a tube connecting the cavity to the outside. For example, the cavity or tube has a tunable dimensional characteristic. The resonator element may also be an electromagnetic actuator moving a membrane and having a moving mass. It may also use an active membrane, such as an electroactive polymer membrane This acoustic shaping device 10 is able to reflect and/or to transmit an incident acoustic wave 41 as a modified acoustic wave 42. The first propagation channel C1 is then an acoustic channel.

The shaping device 10 further comprises a controller 12 of the same type as those already described.

In the first and second embodiments of FIGS. 2 and 3, the shaping device 10 has a wireless connection with an electronic device 20 in order to pilot modifications to the acoustic impedance of the shaping device 10 as a function of the wave 43 received by the receiving unit 22 (microphone) of the electronic device 20.

The optimization module 12b integrated into the controller 12 or the optimization module 12b integrated into the electronic device 20 allows minimizing or maximizing, for example the level of reception of the received acoustic wave 43.

Finally, the shaping device 10 or only the surface 11 may be directly integrated into a constructional element of a building: a concrete block, a brick, insulation, an insulating board, a plasterboard, or any other element.

The shaping device 10 or only the surface 11 may be directly integrated into decorative elements of a building: wood flooring, carpeting, tile flooring, a trim panel, a partition, a ceiling, a dropped-ceiling panel, or other element.

The shaping device 10 or only the surface 11 may be directly integrated into furnishings: a desk, cabinet, bookcase, mirror, decorative table, and lamp.

This element comprises at least the surface 11 of the shaping device or the entire shaping device 10. It may be powered externally, or comprises a battery, or can be remotely powered by induction which is possibly continuous.

Experimental Results

An electromagnetic surface 11 (also called tunable metasurface) is experimentally tested. The optimization method of a shaping device 10 or electronic device 20 or system according to the invention is also tested in the following. The surface 11 is created and covers one small part of the walls of a typical office room as illustrated on FIG. 5.

Figure 5:
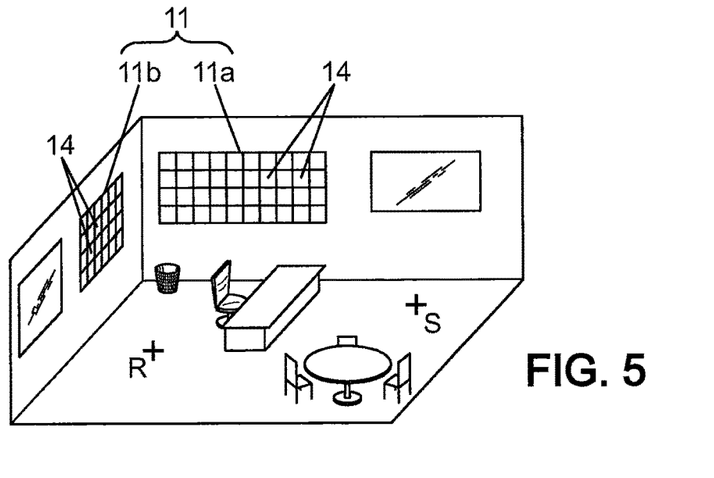
FIG. 5 is a schematic perspective view of an office room that was used as an experimental room to experiment a shaping device according to the invention.

The electromagnetic surface 11 is for example composed of two panels 11a, 11b, each comprising an array or grid of tunable resonant elements (also called unit cells).

Figure 6:
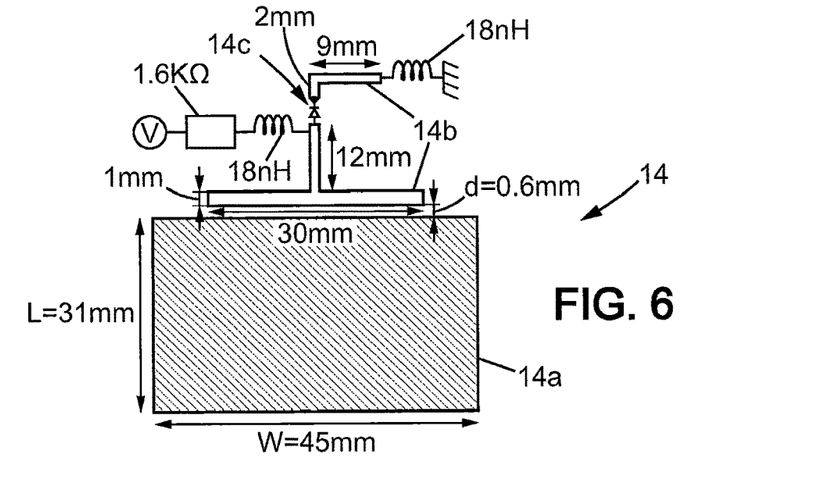
FIG. 6 is a view of a resonant tunable element of the shaping device of FIG. 5.

Each tunable resonant element 14 is for example a planar resonator as represented on FIG. 6 and is able to reflect the waves with a controllable phase shift. We choose to work with resonators that sit on a ground plane since they will anyway be placed on walls, which are ground planes albeit poor ones. For the sake of simplicity and rapid convergence of the optimizations, we opt for the simplest case of a binary phase modulation, that is, a two states resonator that reflects the waves either positively or negatively; it is similar to the binary amplitude modulation realized in optics. To do so, a choice is a resonator that presents a resonance frequency $f_{ref}$ which can be shifted using an electronic circuit. If the resonance frequency $f_{ref}$ is set such that it corresponds to the working frequency $f_0$, the resonator reflects the waves at this frequency with a $\pi$ phase shift. Now when its resonance frequency is shifted away from $f_0$, the resonator is transparent and the ground plane reflects the waves with a 0 phase shift.

We opt for a slightly more complicated design which consists in two strongly coupled or hybridized resonators as described in FIG. 6. The first resonator 14a is called reflecting resonator and is polarized along its short axis which resonance frequency $f_{ref}$ is set to the working frequency $f_0$, while the second resonator 14b is a parasitic strip resonator whose resonance frequency $f_{par}$ can be electronically tuned from the working frequency $f_0$ to a higher frequency $f_1$ using a diode 14c. Doing so, when the resonance frequency $f_{par}$ is set to the higher frequency $f_1$, the reflector resonance frequency $f_{ref}$ is unchanged and it reflects the waves with a $\pi$ phase shift ($\pi$-state). On the contrary when the resonance frequency $f_{par}$ is shifted to the working frequency $f_0$, the two resonators hybridize and a dimmer presenting two resonant frequencies f− and f+ around $f_0$ is created. In this state, at the working frequency $f_0$, the dimer is again transparent and the waves are reflected by the ground plane with a 0 phase shift (0-state).

This design presents notable advantages: the reflection properties of the resonant element 14 are insensitive to both the losses and impedance variations of the electronic components and to the soldering which are placed on the parasitic resonator only.

The electromagnetic surface 11 is a spatial microwave modulator SMM, having an area of approximately 0.4 m2 comprising 102 tunable resonant elements, spaced by half a wavelength at the working frequency $f_0=2.47$ GHz, that is, 6 cm. This tunable metasurface, which is 1.5 mm thin, is a kind of smart wall.

The experimental setup of the office room is schemed in FIG. 5. We control the 102 resonant elements using two Arduino controllers, each having 54 channels of digital outputs. An Agilent network analyzer is used to measure the transmission between a source antenna S and a receiver antenna R. The receiver antenna R is a regular monopole antenna or an electro-optic probe when spatial scanning is realized. We use commercial monopole Wi-Fi antennas polarized along the same axis than the resonant elements 14 of the electromagnetic surface 11. The source antenna S is placed far away and out of sight of both receiver antenna R and the electromagnetic surface 11, inside a furnished and hence scattering 3×3×4 m³ office room (FIG. 5), thereby creating in the whole room and notably on the smart walls a random microwave field. The receiver antenna R is placed for example one meter away from the electromagnetic surface 11.

We first characterize the electromagnetic surface 11. To do so, we measure the resonance frequency of each resonant element 14 of the array in the 0 and π states, using near field probes. The resonance frequencies histogram shows that the π-state distribution is relatively narrow and centered on the working frequency $f_0$, while the 0-state distribution is somewhat broader due to the electronic components but still not overlapping the π-state one.

Figure 7:
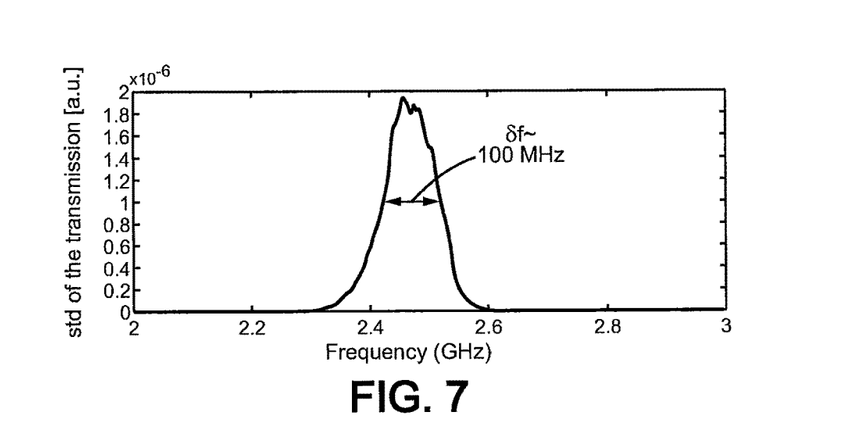
FIG. 7 is a graph of spectral transmission between a source antenna and a receiver antenna in presence of the shaping device of FIG. 5.

We also evaluate the bandwidth (see FIG. 7) of the electromagnetic surface 11 by displaying 11000 random configurations (out of $2^{102}$ combinations of the 102 resonant elements of the electromagnetic surface array) and measuring the standard deviation of the transmission between the source antenna S and the receiver antenna R. We do so for 10 different positions of the source antenna S to average over disorder. This smoothes the spectral variations of the transmission that are due to the room and this gives an estimate of the efficiency of the electromagnetic surface 11 as a function of frequency. We measure a bandwidth of around 100 MHz which can be attributed to the bandwidth of each resonant element and their dimension distribution due to fabrication uncertainties.

In the experiments, we use this SMM to optimize the multiply scattered waves existing in the office room and recycle them for various purposes. For the sake of experimental simplicity the source of microwaves is the network analyzer connected to source antenna S. It results in a random wave field similar to the one that would be created by any remote wireless source such as a base station or a Wi-Fi box. Furthermore since the feedback used is not coherent, optimizing this electromagnetic field or any other one is strictly equivalent.

1) Use to Improve Wireless Signal Reception:

We now use an intensity feedback mechanism to passively optimize the reflection of the multiply scattered waves off the electromagnetic surface 11 such that they focus on the receiver antenna R. Namely, we start with a uniformly reflecting electromagnetic surface 11 (all pixels in 0-state). Then, we iteratively switch each pixel of the array to the π-state and we measure for each one the intensity received on receiver antenna R using the network analyzer. This energy feedback is provided by the computer to the electromagnetic surface 11, that is, if the received energy is higher, the pixel is kept on the π-state, otherwise it is switched back to the 0-state. In a real application scenario, the receiver antenna R could be a smart phone that uses an application which measures in real time the binary error rate of an ongoing communication, and sends a binary feedback based on this estimation to the electromagnetic surface 11, for instance using low frequency ultrasounds. We perform 30 optimizations to average over disorder. For each one we scan the microwave field before and after optimization using a non perturbative electro-optic probe.

Figure 8:
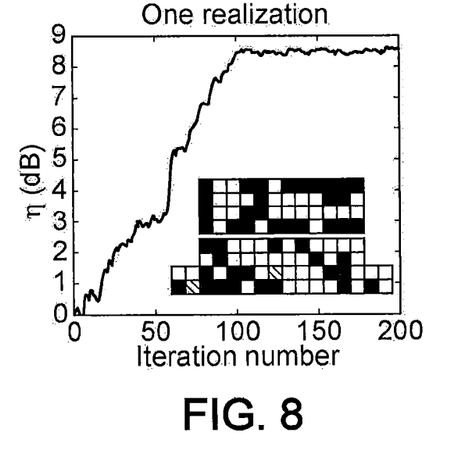
FIG. 8 is a plot showing the efficiency value versus the optimization iterations.
Figure 9:
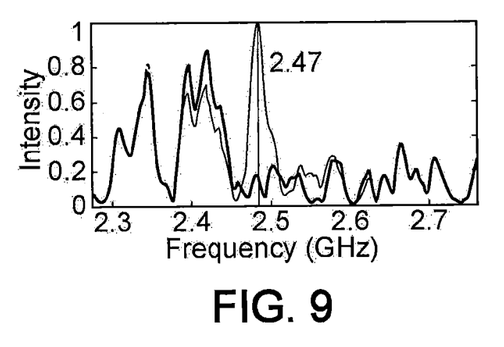
FIG. 9 is a plot showing the spectra at the receiver antenna position in the initial state and the optimized state (after maximization)
Figure 10:
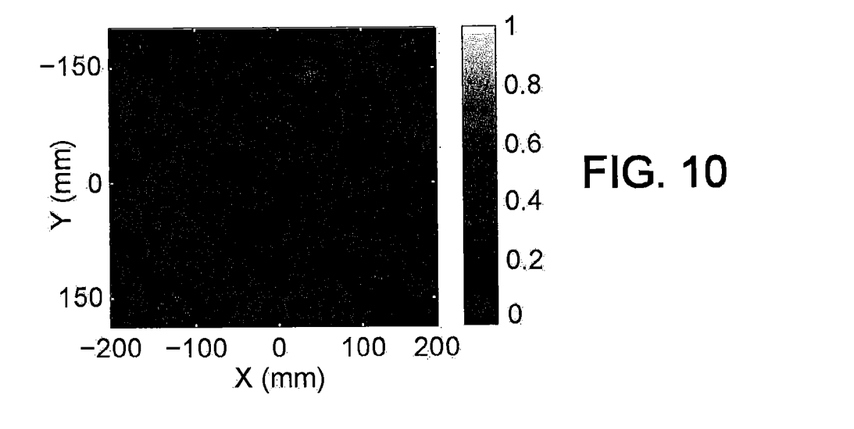
FIGS. 10 and 11 are maps of received signal amplitude around the receiver antenna position at the initial state and the optimized state.
Figure 11:
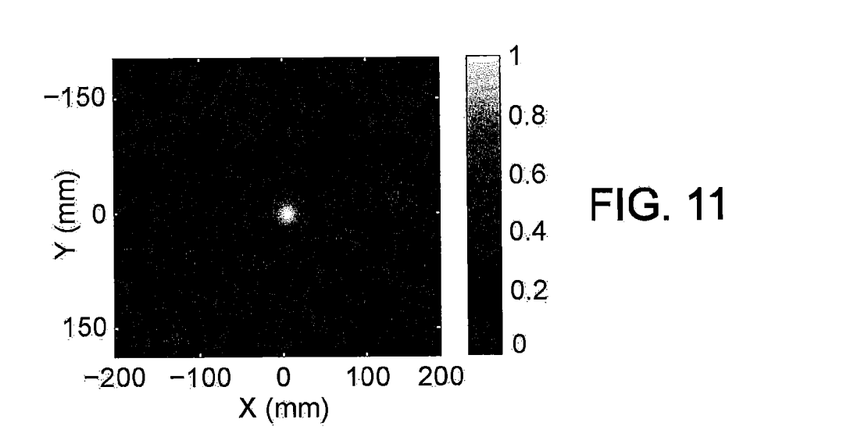
Figure 12:
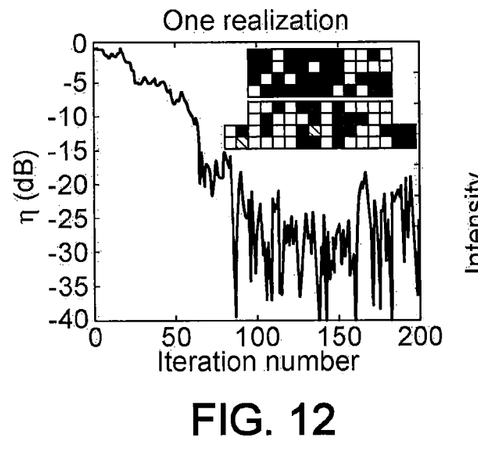
FIG. 12 is a plot showing the efficiency value versus the optimization iterations.
Figure 13:
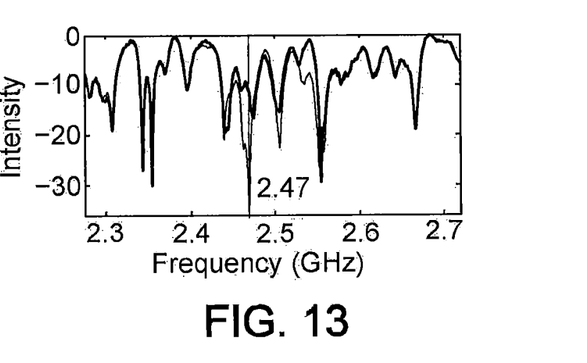
FIG. 13 is a plot showing the spectra at the receiver antenna position in the initial state and the optimized state (after minimization)
Figure 14:
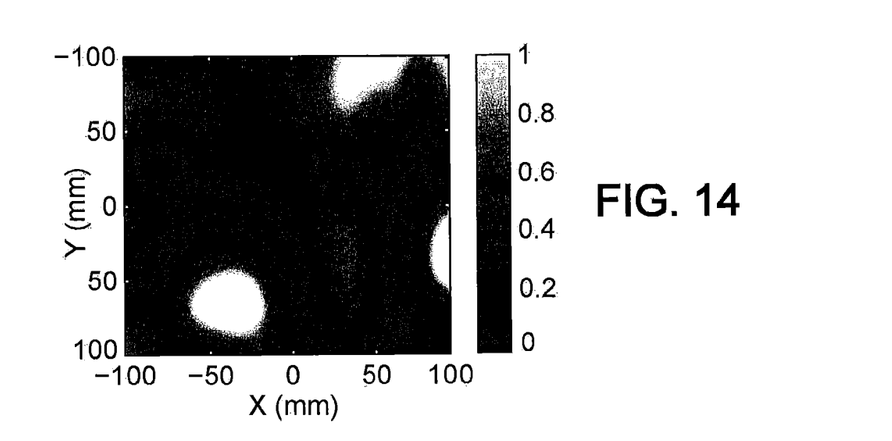
FIGS. 14 and 15 are maps of received signal amplitude around the receiver antenna position at the initial state and the optimized state.
Figure 15:
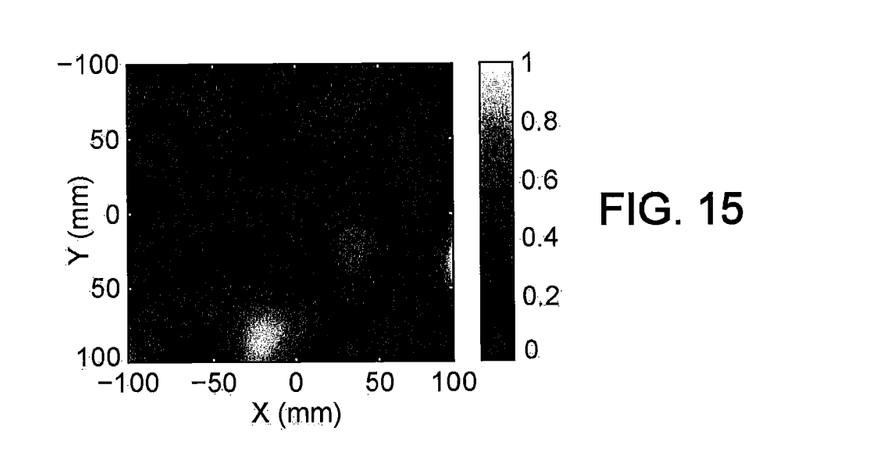

FIG. 8 displays the efficiency η of the intensity obtained using the optimization, defined as the ratio between intensities measured after and before maximization. FIG. 9 shows the corresponding intensity spectra of the transmission between the source antenna S and the receiver antenna R before the maximization (continuous line) and after the maximization (dotted line). The maps of the field intensity around the receiver antenna R positioned at the point coordinates (0,0) is shown on FIG. 9 before maximization and on FIG. 10 after maximization. Clearly, even though the source antenna S is out of sight of both the receiver antenna R and the electromagnetic surface 11, the electromagnetic surface 11 can passively focus the multiply scattered waves onto the receiver antenna R on a half wavelength wide focal spot. This literally turns the random wave field into a focused one, thereby providing a net gain of 8.5 dB on the receiver antenna R, almost a decade. The corresponding spectra corroborates this conclusion, and indicates that the effect survives over a bandwidth of approximately 30 MHz, limited by the correlation frequency of the office room. The inset of FIG. 8 presents the phase mask obtained at the end of the optimization. A black square in the array shows a 0phase state of the resonant element and a white square in the array shows a p-phase state of the resonant element. This again proves that the field on the electromagnetic surface 11 is random.

The above experiments were also done for the 30 realizations of disorder. The data are normalized by the measured mean intensity before optimization. It shows that the average efficiency η obtained is around 8.5 dB, with a minimum of 5 dB, for an intensity which was relatively high before optimization, and a maximum of 35 dB, more than three orders of magnitude, for a very low initial intensity. Spatially, on average, the field is tightly focused around the receiver antenna R, again on a focal spot half a wavelength wide. The mean intensity spectrum, which is almost flat before optimization, meaning that the 30 realizations have almost erased the effect of scattering and reverberation, clearly displays a peak at 2.47 GHz after maximization, as a signature of the focusing effect.

We have also performed experiments with both receiver antenna R and source antenna S out of sight of each other and the electromagnetic surface 11, the three part being spaced one from another by about 3 meters. The results prove that even in this worst case scenario efficiency η between 1.5 dB and 6 dB are realizable, with an average of 2.5 dB. It is worth noting that the electromagnetic surface 11 used is only an area of 0.4 m² as compared to the total wall area of the 3×3×4 m³ office room. Using larger SMMs (electromagnetic surface 11) increases drastically the performances of the approach.

2) Use to Protect Volumes from the Penetration of Microwaves:

We now use the intensity feedback to cancel the electromagnetic field in a given volume thanks to interferences.

To demonstrate this, we use the same optimization procedure than before, albeit with an energy minimization goal. The reception is minimized on receiver antenna R which is again placed at position (0,0), and an electro-optic probe is used to scan the field before and after the minimization without perturbing it. We perform 30 measurements in order to average over disorder and, again, the energy feedback is transmitted by the computer to the electromagnetic surface 11 during the procedures. In a practical application, a passive microwave receiver could be used to measure the electromagnetic energy on a set of sensors and send the feedback to the electromagnetic surface 11, in order for instance to protect a given volume from penetration of Wi-Fi microwave.

Likewise for the maximization, the results of a single realization of minimization are presented on FIGS. 12-15, including the measured intensity spectra and maps before and after the minimization, as well as the diminution of the efficiency η (ratio of intensity before and after minimization) as a function of the iteration number. It proves that an optimized random phase mask permits, as opposed to the bare wall, to decrease the electric field on the receiver antenna R by about 25 dB. The spatial scans and intensity spectra further confirm that the field has been cancelled locally around 2.47 GHz.

The results of 30 realizations of disorder are shows that the averaging has been correctly performed since the average field intensity is almost constant on the initial spatial scan, and the averaged initial spectrum almost flat on the considered bandwidth. The 30 measurements prove that the field can indeed be cancelled at the desired location around the working frequency $f_0$, onto a volume of about half a wavelength cube, down to a level which is here limited to our measurement noise to about −28 dB. Evidently, higher initial intensities lead to better efficiency η of about 35 dB, while lower initial intensities amount lead to about 20 dB intensity drops, all realizations converging towards the experimental noise level.

Theoretical Analysis

After these experiments, it is necessary to evaluate quantitatively the possible benefits that can bring the approach in terms of energy saving for wireless communications or in terms of electromagnetic protection. To start with, the method used amounts to wavefront shaping inside reverberating media and using an electromagnetic surface 11. A typical indoor room is a cavity for electromagnetic waves, albeit a leaky one. Quantifying the outcome of the smart walls consists in estimating the number n of spatial modes that are controlled with the electromagnetic surface 11 versus the total number of spatial modes N that participate to the wavefield in the given room at the working frequency $f_0$. This allows us to calculate the average efficiency or intensity drop factors η which can be achieved for a given electromagnetic surface 11 in a given room.

In the model for the sake of simplicity the field is scalar, the resonant element 14 belonging to the electromagnetic surface 11 reflects the waves isotropically, and a room is approximated by a cuboid cavity of volume V with part of its walls covered by an electromagnetic surface 11 of area S. We consider a regular cavity although rooms can be irregular and are typically furnished hence disordered, but the latter will only serve us to calculate the modal density, which is equal on average for regular and random cavities. A cavity can be described by two characteristic times. The first one, the reverberation time $\tau_R$, represents the average time a photon spends in the cavity: it is formally equivalent to the Thouless time in disordered media. The second one, the Heisenberg time $\tau_H$, represents the time a photon would need to propagate inside the cavity in order to resolve all of its discrete eigenmodes. The inverse of the reverberation time is the correlation frequency $f_{coor}$ of the medium:

$$f_{corr} = \frac{1}{\tau_R}.$$

The correlation frequency $f_{coor}$ corresponds to the frequency bandwidth over which the modes of the cavity are spectrally coherent. In order to estimate the total number of spatial modes N, we must quantify the number of eigenmodes of the cavity that overlap over one frequency correlation of the cavity. This number is approximately given by the Heisenberg time, which equals the modal density of the cavity, multiplied by the correlation frequency of the medium:

$$N = \tau_H f_{corr}.$$

For a cuboid of volume V, at the working frequency $f_0$, and with c the speed of light, it is:

$$N = \tau_H f_{corr} = \frac{8\pi V f_0^2 f_{corr}}{c^3}.$$

As for the number n of modes controlled by the electromagnetic surface 11, it is given by the ratio between its area and the correlation area of the field in the room, which equals the resonant element 14 area in our case:

$$n = \frac{4S}{\lambda^2}.$$

When the electromagnetic surface 11 is not optimized, it behaves just as a regular wall. At any position in the room the field is an incoherent sum of the N spatial modes: the variance of its norm hence scales as a random walk: √N. Optimization aim at adding in phase the n modes controlled with the electromagnetic surface 11 in order to maximize the field or push its norm towards zero. The field after optimization is the incoherent sum of the uncontrolled N−n modes plus or minus the coherent sum of the n controlled modes. We can hence write the efficiency or intensity drop factors brought by the electromagnetic surface 11 as:

$$\eta = \left(\frac{\pm n + \sqrt{N-n}}{\sqrt{N}}\right)^2$$

where
+ corresponds to maximization of the field with the condition n≤N, and
− represents the minimization which is only valid for n≤ √N−n.

This finally allows us to quantify the efficiency and intensity drop factors as a function of the parameters of the smart walls and room, at the working frequency:

$$\eta = \left(\pm\sqrt{\frac{2S^2 f_0^2}{\pi c V f_{corr}}} + \sqrt{1 - \frac{Sc}{2\pi V f_{corr}}}\right)^2$$

which can be approximated to $$\eta = 1 \pm \frac{2S^2 f_0^2}{\pi c V f_{corr}^2} \text{ if } n \ll N.$$

The above equation gives the average gain obtained using smart walls in a room, or the area of the electromagnetic surface 11 required for improving or canceling locally the electromagnetic field.

Figure 16:
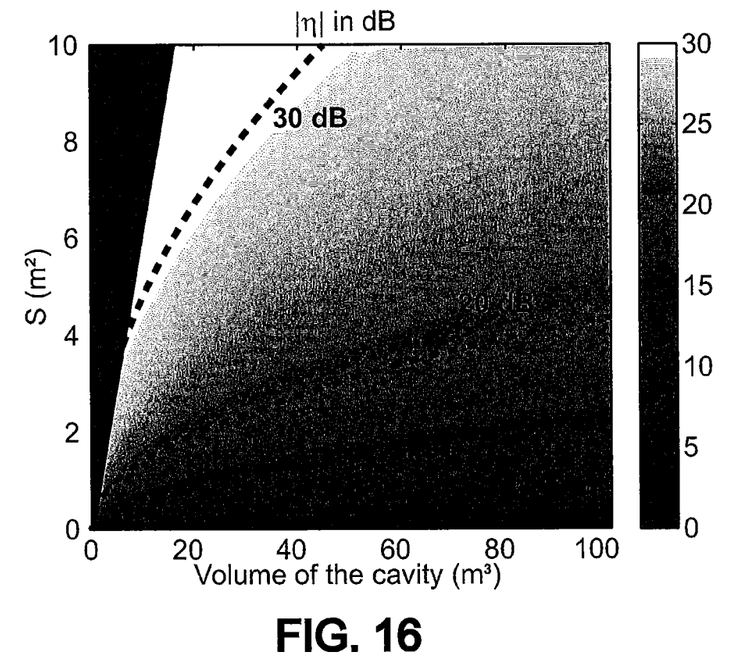
FIG. 16 is a map showing efficiency in enhancement of received signal that can be obtained for various sizes of shaping device as a function of various sizes of rooms.
Figure 17:
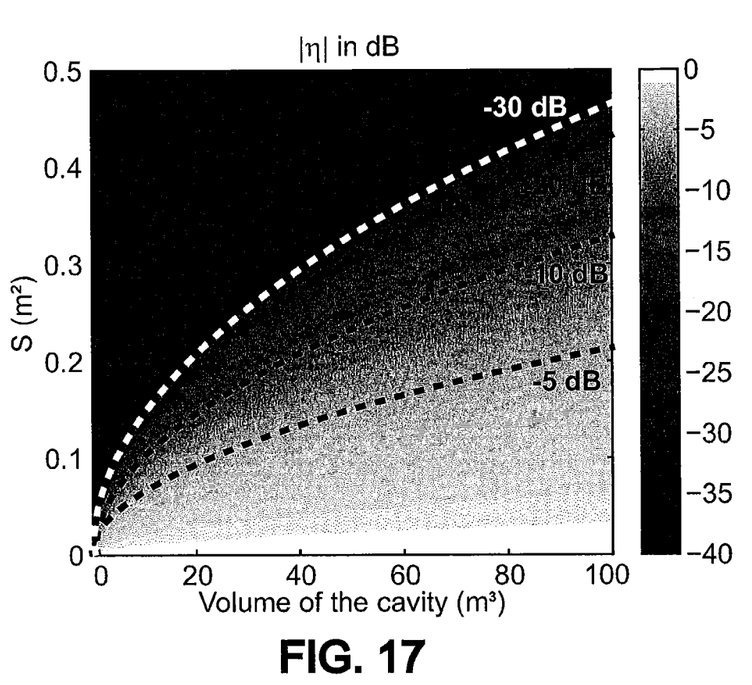
FIG. 17 is a map showing efficiency in cancelling of received signal that can be obtained for various sizes of shaping device as a function of various sizes of rooms.

FIGS. 16 and 17 show the efficiency (improvement and intensity drop) as a function of the room volume V and the electromagnetic surface area S for a correlation frequency of 30 MHz as estimated experimentally and our working frequency $f_0$ of 2.47 GHz. On FIG. 16, an average a 20 dB gain over the wireless reception is obtained with a 2.5 m² electromagnetic surface 11 in a room having a volume of 40 m³. In this configuration the system could permit to decrease the power emitted by wireless sources, whether base stations or a Wi-Fi boxes, by a factor of 100 without damaging the quality of the reception. On FIG. 17, the electromagnetic field on given locations was cancelled using a small electromagnetic surface 11. For instance an electromagnetic surface 11 having an area of 0.3 m² cancels entirely the field at any location in a room having a volume of 40 m³. Of course, protecting larger volume from the penetration of microwaves requires larger smart walls. Finally, using this model and correcting for the binary only phase modulation, we find an average gain of 4.9 dB for the fabricated electromagnetic surface of 0.4 m2 that was used in the 3×3×4 m³ office room of the experiments, right in between the average best and worst case measured, and a minimum of electromagnetic surface area of 0.45 m² necessary to cancel the field locally, in accord with our experiments. This tends to prove that the model, accurately predicts the performances of our approach.

The invention claimed is:

1. A shaping device, comprising:
a surface configured to reflect and/or transmit a primary wave received from a source, said primary wave received by the surface from a first propagation channel of a first network, said surface comprising a plurality of tunable elements configured to change an impedance of said surface and the manner in which the primary wave is reflected and/or transmitted by said surface to an electronic device, said surface a passive device that does not emit additional electromagnetic radiation, said surface being located independently from the source,
a controller connected to the surface, the controller configured to control each one of the tunable elements, and
a transmission module connected to the controller and which is in wireless connection to the electronic device from which it receives a pilot signal, the pilot signal propagating in a second propagation channel in a second local area network different than the first propagation channel of the primary wave, and the second propagation channel being a short range wireless connection in the second local area network having an unobstructed transmission distance range of less than 100 meters, said pilot signal comprising data, the data a function of a value, said value a function of the primary wave as received by the electronic device,
wherein the controller comprises an optimization module configured to minimize or maximize the value to determine the parameters, and wherein the controller of the shaping device is further configured to improve the reception at the electronic device by controlling the tunable elements of the shaping device based on the parameters determined by the optimization module, and
wherein the shaping device is positioned at a location remote from the source generating the primary wave, wherein the shaping device is positioned at a short distance from the electronic device from which the shaping device receives the pilot signal, the short distance less than 100 meters, and
wherein the shaping device is independent from the source and is only connected to the electronic device by the transmission module, and
wherein the source and the electronic device are separate components, the shaping device configured to transmit to the electronic device a modified primary wave.

2. The shaping device according to claim 1, wherein each tunable element comprises only two states, the states of all the tunable elements defining the impedance of the surface.

3. The shaping device according to claim 2, wherein the two states correspond to module or phase shifts.

4. The shaping device according to claim 1, wherein the tunable elements are electromagnetic elements having an electromagnetic tunable characteristic.

5. The shaping device according to claim 1, wherein the tunable elements are acoustic elements having an acoustic tunable characteristic.

6. The shaping device according to claim 1, wherein the transmission module is adapted to receive only short-range wireless transmissions having an unobstructed transmission distance range of less than 100 meters.

7. The shaping device according to claim 1, wherein said wireless connection is selected from the group consisting of a WiFi connection, a Bluetooth connection and a NFC connection.

8. The shaping device according to claim 1, wherein the transmission module is adapted to receive the pilot signal from an acoustic connection that is inaudible-within an ultrasonic frequency band.

9. The shaping device according to claim 1, wherein the transmission module is integrated into the surface.

10. The shaping device according to claim 1, wherein the surface is integrated into an element selected from the group consisting of:
constructional elements of a building, and
decorative elements of the building, and
furnishings.

11. The shaping device according to claim 1, further comprising a power component connected to the surface, said power component being adapted for recovering an amount of energy from a wave received by the surface.

12. The shaping device according to claim 1, further comprising a power component connected to a photoelectric cell, said power component being adapted for recovering an amount of energy from light.

13. The shaping device according to claim 1, wherein the value is chosen from among an amplitude, a power level, and a quality index for the wave received by the electronic device.

14. A system comprising:
a shaping device for interacting with a primary wave received from a source, said primary wave propagating in a first propagation channel of a first network, and
an electronic device, and
wherein the shaping device comprises:
a surface which reflects and/or transmits the primary wave, said surface comprising a plurality of tunable elements configured to change an impedance of said surface and the manner in which the primary wave is reflected and/or transmitted by said surface to the electronic device, said surface a passive device that does not emit additional electromagnetic radiation, and a controller connected to the surface, the controller configured to control each one of the tunable elements, and a transmission module connected to the controller, and wherein the electronic device comprises:

a receiving unit adapted for receiving the primary wave in the first propagation channel from the source, and a processing unit connected to the receiving unit, the processing unit configured to process signals from and to the receiving unit, a monitoring module that determines at least one value that is a function of the primary wave received by the receiving unit of the electronic device, and a transmission unit connected to the processing unit, and which communicates via a wireless connection with the transmission module of the shaping device, and wherein the transmission unit of the electronic device is configured to wirelessly transmit a pilot signal to the transmission module of the shaping device, said pilot signal comprising data or parameters, the data or parameters are a function of said value, the pilot signal propagating in a second propagation channel in a second local area network different than the first propagation channel of the primary wave, and wherein the shaping device is positioned at a location remote from the source generating the primary wave, and wherein the shaping device is positioned at a short distance from the electronic device from which it receives the pilot signal, the short distance less than 100 meters, and the second propagation channel being a short range wireless connection in the second local area network having an unobstructed transmission distance range of less than 100 meters, and wherein the shaping device is independent from the source and is only connected to the electronic device by the transmission module, and wherein the source and the electronic device are separate components, the electronic device receiving a modified primary wave from the shaping device to improve reception of the primary wave at the electronic device, wherein the system further comprises an optimization module located inside the shaping device or the electronic device, said optimization module configured to minimize or maximize said value to determine the parameters, said value a function of the primary wave as received by the electronic device, and wherein the controller of the shaping device is configured to improve the reception at the electronic device by controlling the tunable elements of the shaping device based on the parameters determined by the optimization module.

15. The system according to claim 14, wherein the value is chosen from among an amplitude, a power level, and a quality index for a wave received by the receiving unit.

16. The system according to claim 14, wherein the data comprise said value.

17. The system according to claim 14, wherein the processing unit comprises the optimization module.

* * * * *